US012378802B2

(12) United States Patent
Guthlein et al.

(10) Patent No.: US 12,378,802 B2
(45) Date of Patent: Aug. 5, 2025

(54) ROTARY LATCH ASSEMBLY WITH MULTIPLE STRIKER ENGAGEMENTS

(71) Applicant: Southco, Inc., Concordville, PA (US)

(72) Inventors: James Gerard Guthlein, Malvern, PA (US); Andrew James Thornton, Worcester (GB)

(73) Assignee: Southco, Inc., Concordville, PA (US)

( * ) Notice: Subject to any disclaimer, the term of this patent is extended or adjusted under 35 U.S.C. 154(b) by 260 days.

(21) Appl. No.: 17/642,394

(22) PCT Filed: Sep. 4, 2020

(86) PCT No.: PCT/US2020/049345
§ 371 (c)(1),
(2) Date: Mar. 11, 2022

(87) PCT Pub. No.: WO2021/050372
PCT Pub. Date: Mar. 18, 2021

(65) Prior Publication Data

US 2022/0333416 A1 Oct. 20, 2022

Related U.S. Application Data

(60) Provisional application No. 62/899,427, filed on Sep. 12, 2019.

(51) Int. Cl.

| | |
|---|---|
| ***E05C 17/50*** | (2006.01) |
| ***E05C 3/24*** | (2006.01) |
| ***E05C 19/02*** | (2006.01) |

(52) U.S. Cl.
CPC ................ *E05C 17/50* (2013.01); *E05C 3/24* (2013.01); *E05C 19/024* (2013.01)

(58) Field of Classification Search
CPC .......... E05C 17/50; E05C 3/24; E05C 19/024; E05C 3/06; E05C 3/12; E05C 19/06;
(Continued)

(56) References Cited

U.S. PATENT DOCUMENTS 2,939,735 A * 6/1960 Fikuart ................ E05C 19/024 24/267
3,198,564 A * 8/1965 Welsh ................ E05B 65/0811 292/216

(Continued)

FOREIGN PATENT DOCUMENTS

CN 101180442 A 5/2008
CN 106414875 A 2/2017

(Continued)

OTHER PUBLICATIONS

Espacenet machine translation JPH08312220A 1996 description and claims (Year: 2024).*

(Continued)

*Primary Examiner* — Kristina R Fulton
*Assistant Examiner* — Steven A Tullia
(74) *Attorney, Agent, or Firm* — Buchanan Ingersoll & Rooney PC

(57) ABSTRACT

A rotary latch assembly includes a latch release having a detent and a pawl that is rotatable relative to the latch release about a pivot axis. The pawl includes at least one catch for engaging the detent to releasably hold the pawl in a fixed orientation. At least two contact surfaces are offset from the pivot axis. At least one spring is mounted to the pawl. The pawl is rotatable relative to the latch release between a neutral orientation and at least one non-neutral orientation. The at least one spring accumulates a stored energy during rotation of the pawl toward the at least one non-neutral orientation in response to force applied to one of the at least two contact surfaces, and the spring releases the stored energy when force is removed from one of the at least two contact surfaces to rotate the pawl toward the neutral orientation.

25 Claims, 11 Drawing Sheets

(58) Field of Classification Search
CPC ......... E05B 2015/0448; E05B 17/2015; E05B 85/24; E05B 85/16
See application file for complete search history.

(56) References Cited

U.S. PATENT DOCUMENTS

| | | | | | |
|---|---|---|---|---|---|
| 4,036,517 | A * | 7/1977 | Talmadge | E05C 3/24 | 292/216 |
| 4,126,340 | A * | 11/1978 | Pelcin | G05G 15/00 | 292/336.3 |
| 4,208,837 | A * | 6/1980 | Black, Sr. | E05B 65/1033 | 292/216 |
| 4,457,146 | A * | 7/1984 | Weinerman | E05B 65/0811 | 292/216 |
| 4,480,863 | A * | 11/1984 | Hormann | E05B 65/0021 | 292/216 |
| 4,500,120 | A * | 2/1985 | Ridgewell | E05B 65/0858 | 292/19 |
| 4,703,961 | A * | 11/1987 | Weinerman | E05C 3/24 | 292/216 |
| 4,835,997 | A * | 6/1989 | Akright | E05B 83/367 | 292/216 |
| 4,896,906 | A * | 1/1990 | Weinerman | E05B 85/243 | 292/341.12 |
| 5,520,423 | A * | 5/1996 | Finkelstein | E05C 17/60 | 292/29 |
| 5,573,287 | A * | 11/1996 | Takimoto | E05B 65/0811 | 292/29 |
| 5,683,124 | A * | 11/1997 | Karpisek | E05C 3/06 | 292/336.3 |
| 5,809,694 | A * | 9/1998 | Postans | E05B 65/0007 | 49/463 |
| 5,979,949 | A * | 11/1999 | Finkelstein | E05B 83/04 | 292/29 |
| 6,471,260 | B1 * | 10/2002 | Weinerman | E05C 3/24 | 292/216 |
| 6,474,705 | B1 | 11/2002 | Mori et al. | | |
| 6,688,658 | B2 * | 2/2004 | Mori | E05B 65/0852 | 292/218 |
| 6,711,857 | B1 * | 3/2004 | Wagnitz | E05B 47/0002 | 49/394 |
| 6,729,661 | B2 * | 5/2004 | Perez-Sanchez | E05B 81/10 | 292/25 |
| 7,097,216 | B2 * | 8/2006 | Lane | E05B 85/247 | 292/216 |
| 7,699,363 | B2 | 4/2010 | Langfermann et al. | | |
| 7,959,194 | B2 * | 6/2011 | Mahoney | E05C 19/10 | 292/99 |
| 8,215,685 | B2 * | 7/2012 | Ellis | E05B 3/065 | 292/336.3 |
| 8,459,724 | B2 * | 6/2013 | Tsumiyama | E05C 3/24 | 296/146.9 |
| 8,931,813 | B2 * | 1/2015 | Juga | E05B 13/004 | 292/216 |
| 9,546,503 | B2 * | 1/2017 | Krueger | E05B 47/06 | |
| 9,670,701 | B2 | 6/2017 | Okawa et al. | | |
| 9,915,082 | B2 * | 3/2018 | Garneau | E05B 65/46 | |
| 10,590,682 | B2 | 3/2020 | Chevalier | | |
| 10,662,683 | B2 * | 5/2020 | Pettengill | E05B 81/15 | |
| 11,795,737 | B2 * | 10/2023 | Underwood | E05B 79/04 | |
| 11,879,281 | B2 * | 1/2024 | Welbig | E05C 7/005 | |
| 2003/0015879 | A1 | 1/2003 | Finkelstein et al. | | |
| 2006/0012184 | A1 * | 1/2006 | Ottesen | E05C 3/24 | 292/216 |
| 2010/0264672 | A1 * | 10/2010 | Ellis | E05B 3/065 | 292/87 |

FOREIGN PATENT DOCUMENTS

| | | | | |
|---|---|---|---|---|
| DE | 4226127 | A1 * | 12/1993 | E05B 85/26 |
| DE | 19928507 | A1 * | 12/2000 | B60N 2/2245 |
| DE | 102004049068 | A1 * | 4/2006 | E05C 19/02 |
| EP | 0798439 | A1 * | 3/1997 | E05C 19/02 |
| EP | 1041229 | A2 | 10/2000 | |
| EP | 1617024 | A2 * | 1/2006 | E05B 65/0021 |
| EP | 1717392 | A2 | 11/2006 | |
| EP | 3095935 | A1 * | 11/2016 | E05C 3/24 |
| EP | 3715566 | A1 * | 9/2020 | E05B 85/243 |
| GB | 1007076 | A * | 10/1965 | E05C 19/02 |
| GB | 2294080 | A * | 4/1996 | E05B 65/0007 |
| GB | 2414035 | A * | 11/2005 | B60N 2/2887 |
| GN | 1007076 | A * | 3/1964 | E05C 19/02 |
| JP | H0710329 | U * | 2/1995 | E05C 17/32 |
| JP | H08312220 | A | 11/1996 | |
| JP | 2015031132 | A | 2/2015 | |
| KR | 101049438 | B1 * | 3/2009 | E05B 85/24 |
| WO | WO-2016058565 | A2 * | 4/2016 | E05C 19/024 |

OTHER PUBLICATIONS

Chinese Office Action for Chinese Application No. 202080078494.9, issued Aug. 1, 2023 with translation, 15 pages.

International Search Report and Written Opinion for International Application No. PCT/US2020/049345, dated Dec. 11, 2020, 9 pages.

International Preliminary Report on Patentability and Written Opinion for International Application No. PCT/US2020/049345, Issued Mar. 15, 2022, 8 pages.

* cited by examiner

ROTARY LATCH ASSEMBLY WITH MULTIPLE STRIKER ENGAGEMENTS

CROSS REFERENCE TO RELATED APPLICATIONS

This Application is a U.S. national phase application filed under 35 U.S.C. § 371 claiming benefit to International Patent Application No. PCT/US2020/049345, filed Sep. 4, 2020, which is related to, and claims the benefit of priority of U.S. Provisional Application No. 62/899,427, entitled ROTARY LATCH ASSEMBLY WITH MULTIPLE STRIKER ENGAGEMENTS, filed on Sep. 12, 2019, the contents of which are incorporated herein by reference in their entirety for all purposes.

FIELD

The present disclosure relates generally to rotary latch assemblies, and more specifically to a rotary latch assembly with multiple striker engagements and a single release.

BACKGROUND

Objects that are movable on pivot connections often require a mechanism for locking the position of the object after pivoting. Examples of objects that may require such locking include doors that can be pivoted on a hinge to a raised position. Rotary latches provide one option for locking objects after pivoting.

SUMMARY OF INVENTION

A rotary latch assembly includes a latch release having a detent and a pawl that is rotatable relative to the latch release about a pivot axis. The pawl includes at least one catch for engaging the detent to releasably hold the pawl in a fixed orientation. At least two contact surfaces are offset from the pivot axis. At least one spring is mounted to the pawl. The pawl is rotatable relative to the latch release between a neutral orientation and at least one non-neutral orientation. The at least one spring accumulates a stored energy during rotation of the pawl toward the at least one non-neutral orientation in response to force applied to one of the at least two contact surfaces, and the spring releases the stored energy when force is removed from one of the at least two contact surfaces to rotate the pawl toward the neutral orientation.

BRIEF DESCRIPTION OF THE DRAWING FIGURES

The present disclosure contains non-limiting examples, details of which are shown in the drawing figures, of which:

DETAILED DESCRIPTION

Figure 1:
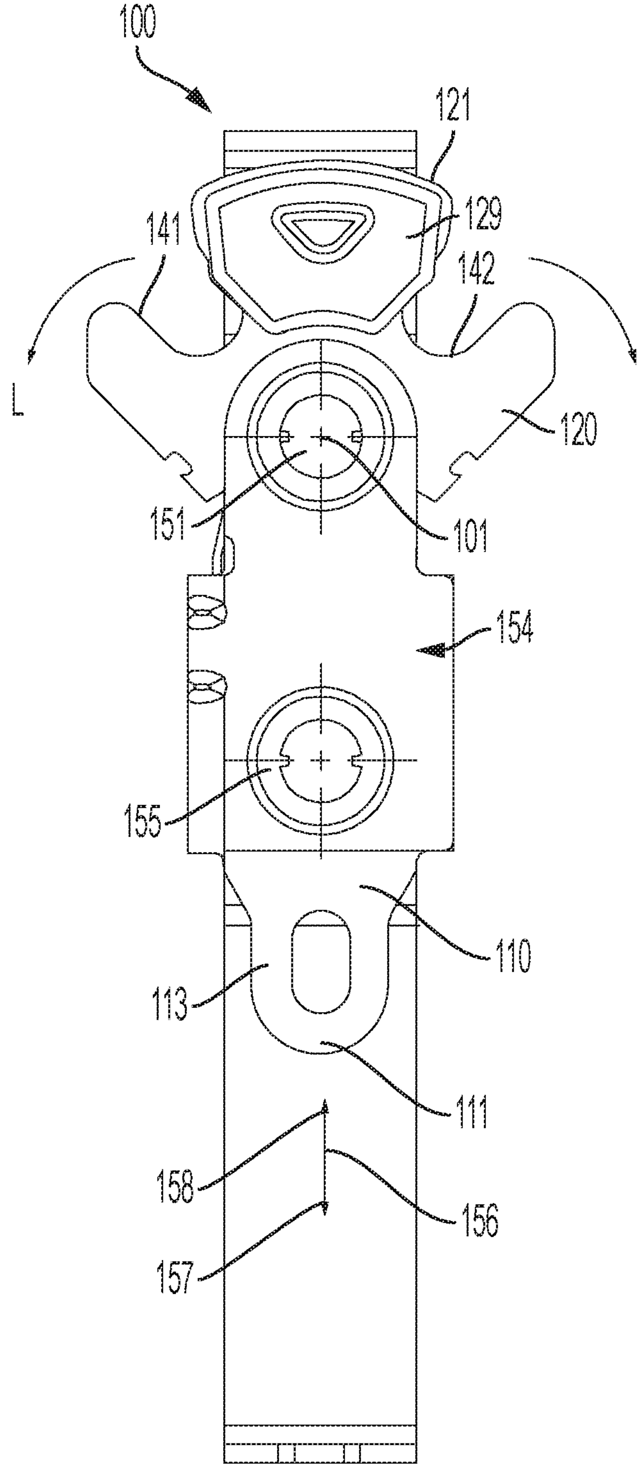
FIG. 1 is a top view of a latch assembly according to a first embodiment.
Figure 2:
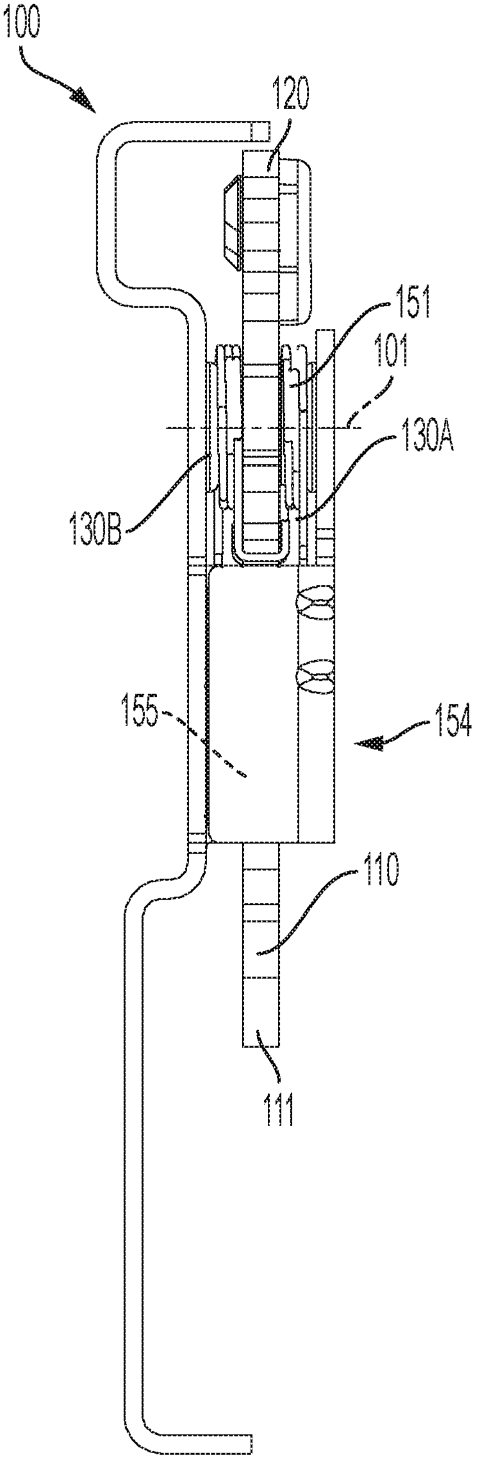
FIG. 2 is a side view of the latch assembly of FIG. 1.
Figure 3:
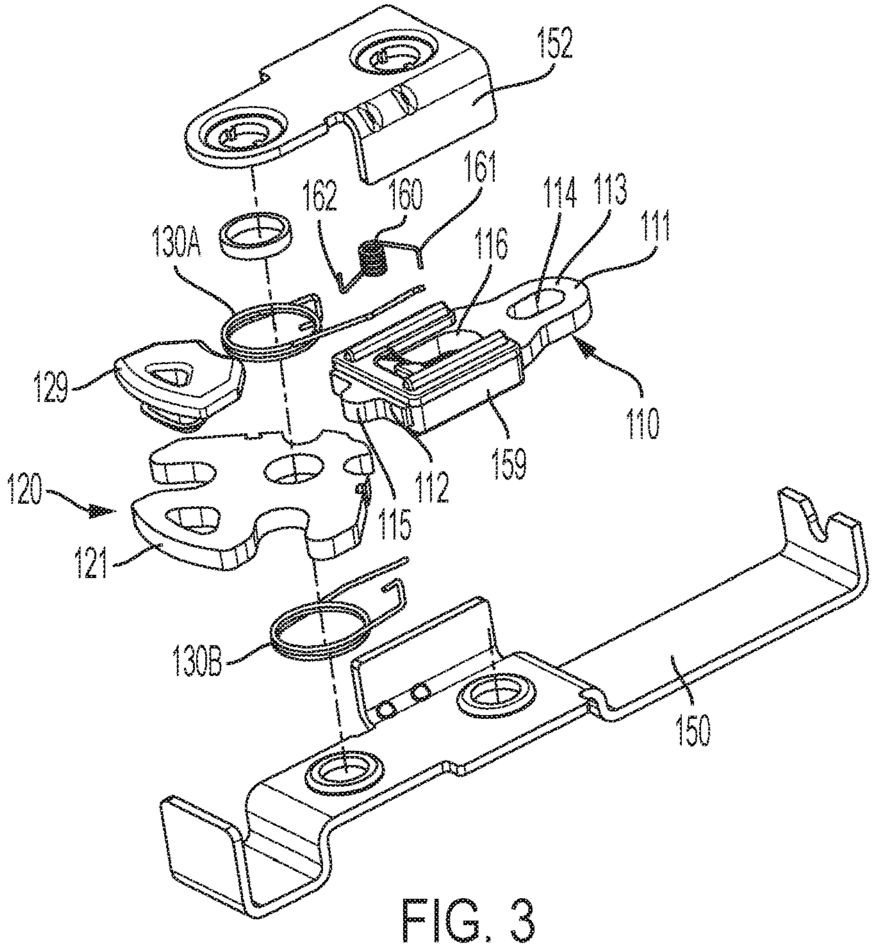
FIG. 3 is an exploded perspective view of the latch assembly of FIG. 1.

Although the present disclosure illustrates and describes specific embodiments, the present disclosure is not intended to be limited to the details shown. Rather, the details can be modified within the scope and range of equivalents of the claims and without departing from the present disclosure. In addition, the details of different embodiments shown herein can be combined or substituted in any manner to form additional embodiments that are encompassed by the present disclosure.

Various terms are used throughout this disclosure to refer to certain structures. Unless otherwise indicated, terms are given the following meanings.

The terms "detent", "catch", and "contact surface" mean any surface configuration, including but not limited to a protrusion, projection, protuberance, pin, tab, bore, slot, recess, convex surface, concave surface, or surface discontinuity, that receives force from, positively engages, or abuts another object.

The term "spring" means one or more components that store and release mechanical energy, including but not limited to torsion springs, compression springs, tension springs, leaf springs, spring washers, spring tabs, and other biasing elements.

Latch assemblies according to the present disclosure can feature a pawl with multiple contact surfaces that allow a latch assembly to interact with objects located on different sides or positions relative to the latch assembly. This allows a single latch assembly to be used in different applications and arrangements. For example, a latch assembly with multiple contact surfaces can be mounted in one orientation that will work in applications where a striker (such as a striker bolt) strikes the latch assembly from a first side (e.g. top or front of latch assembly), and applications where a striker strikes the latch assembly from a second side different from the first side (e.g. bottom or rear of latch assembly).

Multiple contact surfaces can also allow a latch assembly to be locked in two or more positions. Objects that are joined by the latch assembly can therefore be locked in two or more arrangements. For example, a latch assembly according to one embodiment may allow a pivotably mounted object to be releasably locked in a raised position, a semi-raised position and a lowered position. A latch assembly according to another embodiment may allow a pivotably mounted object to be releasably locked in a counterclockwise rotated position, a neutral or centered position and a clockwise rotated position.

By providing multiple contact surfaces, a single latch according to the present disclosure can do the work of multiple separate latches, thereby avoiding the need to install multiple separate latches in an installation. This reduces the cost and requires less maintenance than an installation with multiple latches.

In a first aspect of the present disclosure, a rotary latch assembly includes a latch release having a detent and a pawl.

In another aspect of the present disclosure, the pawl is rotatable relative to the latch release about a pivot axis, and includes at least one catch for engaging the detent to releasably hold the pawl in a fixed orientation.

In another aspect of the present disclosure, at least two contact surfaces are offset from the pivot axis, and at least one spring is mounted to the pawl.

In another aspect of the present disclosure, the pawl is rotatable relative to the latch release between a neutral orientation and at least one non-neutral orientation.

In another aspect of the present disclosure, the at least one spring accumulates a stored energy during rotation of the pawl toward the at least one non-neutral orientation in response to force applied to one of the at least two contact surfaces.

In another aspect of the present disclosure, the spring releases the stored energy when force is removed from the one of the at least two contact surfaces to rotate the pawl toward the neutral orientation.

In another aspect of the present disclosure, the at least two contact surfaces include a first contact surface and a second contact surface.

In another aspect of the present disclosure, the pawl is rotatable relative to the latch release in a first direction in response to force applied to the first contact surface, and rotatable relative to the latch release in a second direction in response to force applied to the second contact surface.

In another aspect of the present disclosure, the at least one catch of the pawl includes a first catch and a second catch.

In another aspect of the present disclosure, the at least one non-neutral orientation of the pawl includes a first orientation, in which the first catch of the pawl engages the detent of the latch release.

In another aspect of the present disclosure, the at least one non-neutral orientation of the pawl includes a second orientation, in which the second catch of the pawl engages the detent of the latch release.

In another aspect of the present disclosure, the at least one spring mounted to the pawl includes a first torsion spring and a second torsion spring.

In another aspect of the present disclosure, the first torsion spring stores energy in response to rotation of the pawl in the first direction, and the second torsion spring stores energy in response to rotation of the pawl in the second direction.

In another aspect of the present disclosure, at least one catch of the pawl includes a third catch between the first catch and the second catch.

In another aspect of the present disclosure, the third catch of the pawl engages the detent of the latch release in the neutral orientation.

In another aspect of the present disclosure, the pawl defines an axis of symmetry extending between the pivot center and the third catch.

In another aspect of the present disclosure, the first contact surface and second contact surface are arranged symmetrically about the axis of symmetry.

In another aspect of the present disclosure, the first catch and second catch are arranged symmetrically about the axis of symmetry.

In another aspect of the present disclosure, the pawl is pivotally mounted to the mounting element.

In another aspect of the present disclosure, the mounting element includes a housing having a rear base plate and a cover plate.

In another aspect of the present disclosure, the latch release is axially translatable but not rotatable relative to the mounting element.

In another aspect of the present disclosure, the latch release is rotatable but not axially translatable relative to the mounting element.

In another aspect of the present disclosure, the latch release is movable relative to the mounting element between a latching position, in which the detent mates with the at least one catch to releasably hold the pawl in a fixed orientation, and a release position, in which the detent is not engaged with the at least one catch.

In another aspect of the present disclosure, a trigger spring is mounted between the latch release and mounting element, the trigger spring biasing the latch release toward the latching position.

In another aspect of the present disclosure, the latch release is movable in only one direction relative to the mounting element when moved toward the release position.

In another aspect of the present disclosure, a kit includes a rotary latch assembly according to any of the preceding aspects and at least one striker.

In another aspect of the present disclosure, a fixture includes a rotary latch assembly according to any of the preceding aspects.

In another aspect of the present disclosure, the fixture includes a first striker, a second striker, and an object that is movable between a first position and a second position.

In another aspect of the present disclosure, the object is pivotable between the first position and the second position.

In another aspect of the present disclosure, the object is translatable between the first position and the second position.

In another aspect of the present disclosure, the object is lockable in the first position by engagement of the rotary latch assembly with the first striker, and lockable in the second position by engagement of the rotary latch assembly with the second striker.

In another aspect of the present disclosure, the object is a bunk bed.

Referring now to the drawing figures generally, and FIGS. 1-4 specifically, a latch assembly 100 will be described according to a first example. Latch assembly 100 includes a latch release 110 having a proximal end 111 and a distal end 112. Proximal end 111 comprises a handle 113 that can be pulled manually to move the latch release to a release position. Handle 113 includes an aperture 114 that can be connected to an optional knob or other accessory that allows a user to easily pull the handle. Distal end 112 includes a detent 115 in the form of a rounded tab.

Latch assembly 100 also includes a pawl 120 that is rotatable relative to the latch release 110 about a pivot axis 101. Pawl 120 is rotatable relative to the latch release between a neutral (or zero rotation) orientation and two non-neutral (or non-zero rotation) orientations. FIG. 1 shows pawl rotated to the neutral orientation.

Pawl 120 includes a proximal end 121 and a distal end 122. Proximal end 121 defines an aperture that attaches to a gripping element 129. Distal end 122 has three catches 123, 124, 125 that are identified individually in FIG. 4. Each of catches 123, 124, 125 is in the form of a rounded notch adapted to receive and matingly engage with detent 115 on latch release 110. The concave curvature of each notch conforms to the convex curvature of detent 115, such that a positive engagement between the detent and each notch occurs when that notch is rotated into alignment and centered with the detent. Latch release 110 is mounted in a manner that prevents the latch release from rotating, as will be explained. In addition, latch release 110 is biased by a spring element toward pawl 120, as will be explained. In this arrangement, detent 115 is firmly seated in one of the catches 123, 124, 125. The positive engagement between detent 115 and each of catches 123, 124, 125 creates a stable condition that resists rotation of pawl 120 relative to latch release 110.

Latch assembly 100 further includes two opposing torsion springs 130A and 130B mounted to opposite sides of pawl 120. Each torsion spring 130A, 130B is configured to wind and unwind in response to rotation of pawl 120 in a specific direction. Referring back to FIG. 1 for reference, torsion spring 130B accumulates a stored energy during rotation of pawl 120 in a first direction L, and torsion spring 130A accumulates a stored energy during rotation of pawl 120 in a second direction R opposite direction L. Pawl 120 can be rotated in the first direction L until detent 115 mates and releasably locks with catch 125 in a first non-neutral orientation, at which point torsion spring 130B is held under stored energy. Conversely, pawl 120 can be rotated in second direction R until detent 115 mates and releasably locks with catch 123 in a second non-neutral orientation, at which point torsion spring 130A is held under stored energy. Stored energy in torsion spring 130B creates a spring bias that urges pawl 120 to rotate in second direction R back toward the neutral orientation. Stored energy in torsion spring 130A creates a spring bias that urges pawl 120 to rotate in first direction L back toward the neutral orientation. The positive engagement between detent 115 and each catch 123, 125 creates sufficient resistance force that exceeds the spring bias created in torsion springs 130A, 130B. Therefore, pawl 120 cannot be rotated out of engagement with latch release 110 and returned to the neutral orientation until detent 115 is disengaged from the pawl.

Pawl 120 also includes a midsection 140 that includes a first contact surface 141 and a second contact surface 142. Each of contact surfaces 141, 142 is configured to receive force from an object such as a striker. Force can be received either from a moving object that collides with one of the contact surfaces, or one of the contact surfaces colliding with a stationary object. First and second contact surfaces 141, 142 are configured such that force received by either contact surface causes pawl 120 to rotate out of the neutral orientation and toward one of the non-neutral orientations.

Force applied to first contact surface 141 causes pawl 120 to rotate in first direction L until the pawl reaches the first non-neutral orientation and catch 125 engages detent 115. During this rotation, stored energy accumulates and remains in torsion spring 130B until catch 125 is released from detent 115. Once detent 115 is moved out of engagement with catch 125, pawl 120 is no longer held against rotation, allowing torsion spring 130B to release its stored energy and unwind, and causing the pawl to return to the neutral orientation.

Similarly, force applied to second contact surface 142 causes pawl 120 to rotate in second direction R until the pawl reaches the second non-neutral orientation and catch 123 engages detent 115. During this rotation, stored energy accumulates and remains in torsion spring 130A until catch 123 is released from detent 115. Once detent 115 is moved out of engagement with catch 123, pawl 120 is no longer held against rotation, allowing torsion spring 130A to release its stored energy and unwind, and causing the pawl to return to the neutral orientation.

Figure 4:
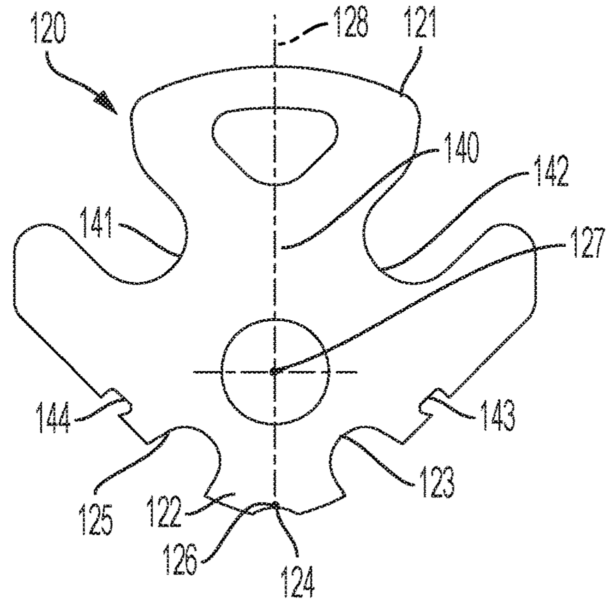
FIG. 4 is a top view of a component of the latch assembly of FIG. 1.

Third catch 124, which is between first catch 123 and second catch 125, is configured to engage detent 115 when pawl 120 is in the neutral orientation. Referring to FIG. 4, third catch 124 has a midpoint 126. Pawl 120 has a pivot center 127 aligned with pivot axis 101. Midpoint 126 and pivot center 127 lie on a common line defining an axis of symmetry 128. Axis of symmetry 128 therefore extends through midpoint 126 and pivot center 127. First contact surface 141 and second contact surface 142 are arranged symmetrically about axis of symmetry 128. First catch 123 and second catch 125 are also arranged symmetrically about axis of symmetry 128. Pawl 120 further defines a first cut out 143 and a second cut out 144. Cut out 143 is configured to attach to an end section of torsion spring 130A, and cut out 144 is configured to attach to an end section of torsion spring 130B. First and second cut outs 143, 144 are also arranged symmetrically about axis of symmetry 128.

Latch release 110, pawl 120, and torsion springs 130A, 130B are mounted to a mounting element in the form of a base plate 150. A cover plate 152 is attachable to base plate 150 over latch release 110, pawl 120, and torsion springs 130A, 130B. In this arrangement, base plate 150 and cover plate 152 collectively form a housing 154 that partially encloses latch release 110, pawl 120, and torsion springs 130A, 130B. Latch release 110 is mounted to base plate 150 by a slide coupling 155, which can be in the form of pin, bolt, rivet or other connector extending through an elongated aperture 116 in the latch release. Slide coupling 155 allows latch release 110 to translate relative to base plate 150 but not rotate. The direction of translation is shown by double arrow 156 in FIG. 1. Pawl 120 is pivotally mounted to base plate 150 about pivot center 127 by a pivot coupling 151, which can be a pin connection, bolt, rivet or other pivot connector. Pivot coupling 151 allows pawl 120 to rotate relative to base plate 150 in first direction L and second direction R, but not translate relative to the base plate.

Latch release 110 is translatable relative to base plate 150 between a latching position and a release position. More specifically, latch release 150 moves in a proximal direction 157 toward the release position, and moves in a distal direction 158 toward the latching position. In the latching position, detent 115 mates with one of catches 123, 124, 125 to hold pawl 120 in a fixed orientation. In the release position, detent 115 is disengaged from catches 123, 124, 125. When pawl 120 is retained by latch release 110 in the latching position in one of the non-neutral orientations, movement of latch release 110 to the release position causes the pawl to spring or snap to the neutral orientation in response to energy released from one of torsion springs 130A, 130B. Latch release 110 only moves in one direction relative to base plate 150 to release pawl 120, regardless of which orientation the pawl is held.

Latch release 110 is attached to a sleeve 159 that is over molded around the latch release. Sleeve 159 is sandwiched between base plate 150 and cover plate 152. A trigger spring 160 is mounted between latch release 110 and sleeve 159. Trigger spring 160 is a torsion spring having a first end 161 attached to latch release 110 and a second end 162 attached to sleeve 159. Trigger spring 160 is configured to wind and store energy as latch release 110 is manually pulled toward the release position, and to unwind and release that stored energy as pulling force on the latch release is removed. As such, latch release 110 is biased toward the latching position and into contact with pawl 120. If unopposed by a manual pulling force, the biasing force on latch release 110 maintains detent 115 in slidable engagement with distal end 122 of pawl 120, such that detent readily snaps into one of catches 123, 124, 125 that aligns with the detent.

FIGS. 5-9 show a latch assembly 200 according to another example. Latch assembly 200 is similar in many respects to latch assembly 100 but utilizes a latch release 210 that rotates rather than translates. In addition, latch release 210 has a detent 215 that has a compound curvature. In particular, detent 215 has a first detent portion 215A in the form of a rounded notch. Detent 215 also has a second detent portion 215B in the form of a convex face, with one end of the convex face adjoining one end of the rounded notch. First and second detent portions 215A, 215B therefore lie immediately adjacent one another on the exterior of latch release 210.

Figure 5:
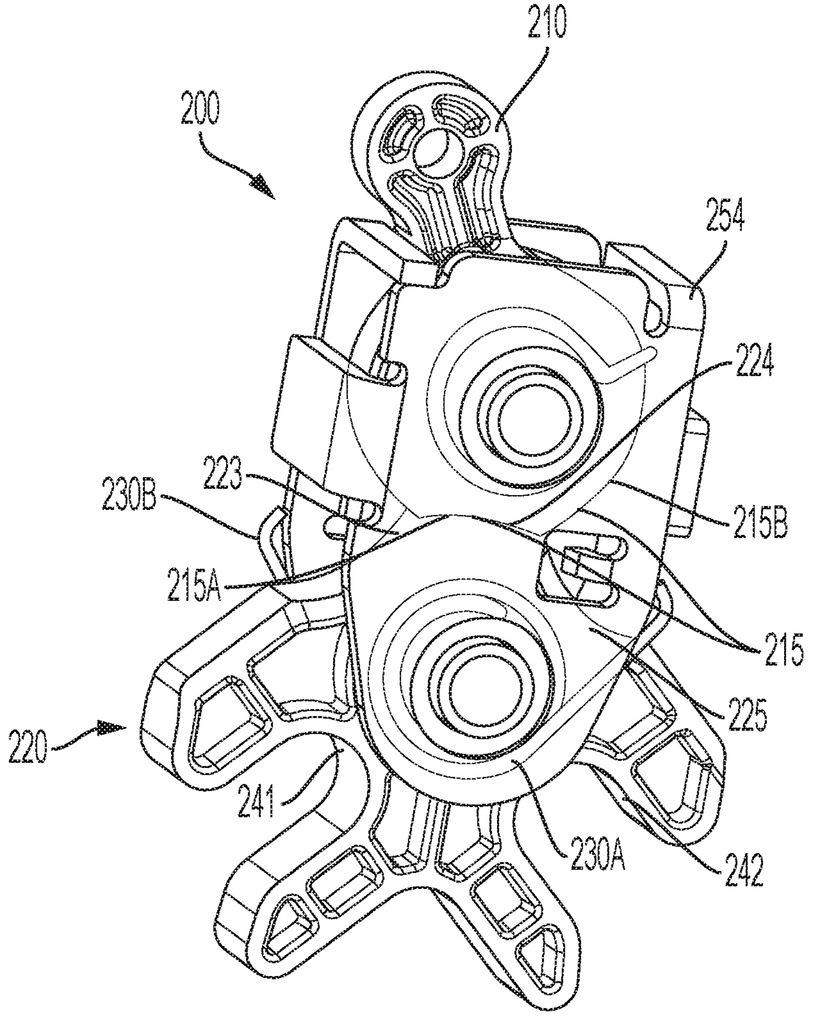
FIG. 5 is a perspective view of a latch assembly according to a second embodiment, in which a housing is shown semi-transparent to illustrate other components inside the housing.
Figure 7:
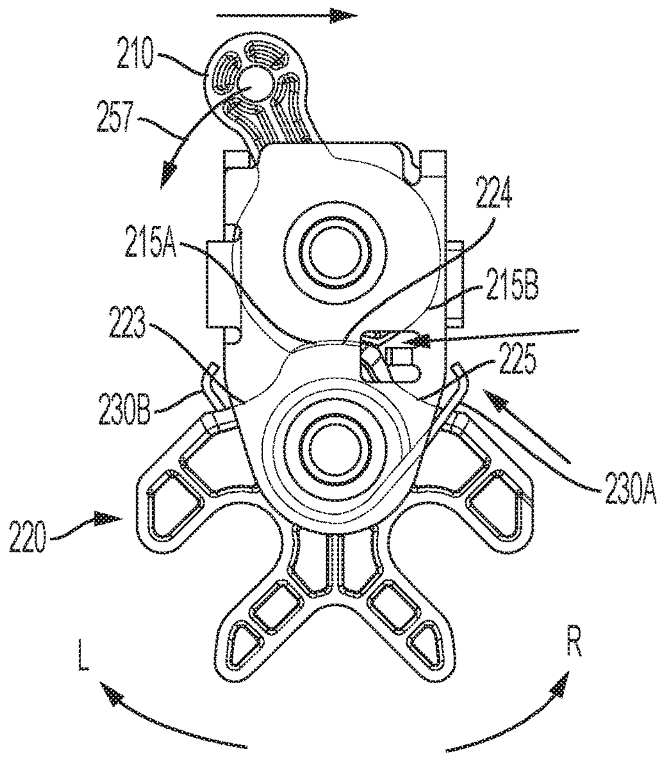
FIG. 7 is a top view of the latch assembly of FIG. 5 shown in a first operative state.
Figure 8:
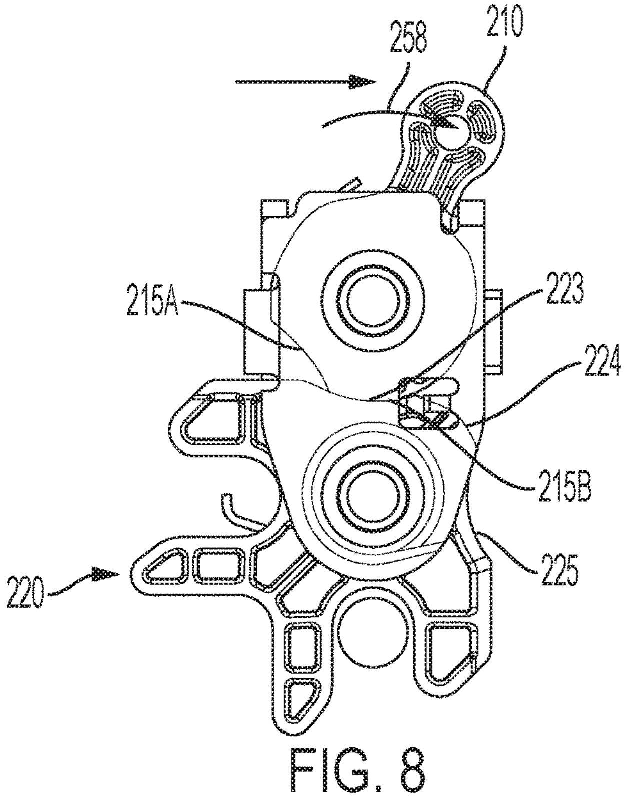
FIG. 8 is a top view of the latch assembly of FIG. 5 shown in a second operative state.
Figure 9:
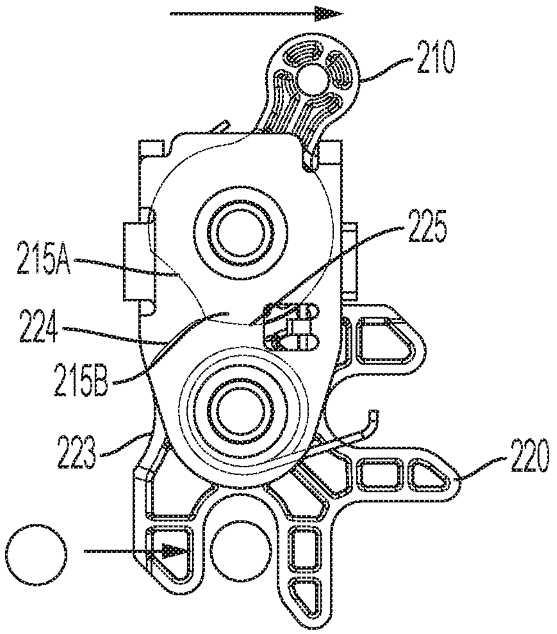
FIG. 9 is a top view of the latch assembly of FIG. 5 shown in a third operative state.

Latch assembly 200 also has a slightly different pawl 210 that features a central catch 224 with a convex face, rather than a rounded notch, and two other catches 223, 225 on each side of catch 224. Catch 224 engages first detent portion 215A in the neutral orientation, as shown in FIGS. 5 and 7. Catches 223 and 225 align with second detent portion 215B in non-neutral orientations, as shown in FIGS. 8 and 9. Each catch 223 and 225 aligns with the same portion of latch release 210, i.e. second detent portion 215B, in their corresponding non-neutral orientations.

As with pawl 120, pawl 220 has a pair of opposing torsion springs 230A and 230B mounted to opposite sides of the pawl. Each torsion spring 230A, 230B is configured to wind and unwind in response to rotation of pawl 220 in the same manner as torsion springs 130A and 130B. Referring to FIG. 7, pawl 220 can be rotated in a first direction L from the neutral orientation until second detent portion 215B mates with catch 223. This releasably retains pawl 220 in a first non-neutral orientation shown in FIG. 8, at which point torsion spring 230A is held under stored energy. Conversely, pawl 220 can be rotated in second direction R until second detent portion 215B mates with catch 225. This releasably retains pawl 220 in a second non-neutral orientation shown in FIG. 9, at which point torsion spring 230B is held under stored energy.

Latch release 210, pawl 220, and torsion springs 230A, 230B are mounted to a base plate 250 and cover plate 252 that collectively form a housing 254 that partially encloses the components. Latch release 210 is rotatable relative to base plate 250 between a first position and a second position. More specifically, latch release 210 can rotate in a counterclockwise direction 257, shown in FIG. 7, toward the first position to engage first detent portion 215A with catch 224. In this position, first detent portion 215A maintains pawl 220 in the neutral orientation. Latch release 210 can also rotate in a clockwise direction 258, shown in FIG. 8, toward the second position to engage second detent portion 215B with either of catches 223 and 225, depending on which direction pawl 220 is rotated.

A trigger spring 260 in the form of a torsion spring is connected between latch release 210 and housing 254. Trigger spring 260 is configured to wind and store energy as latch release 210 is manually rotated toward the first position, and to unwind and release that stored energy as the latch release rotates toward the second position. As such, latch release 210 is biased toward the second position in which second detent portion 215B engages catch 223 or catch 225. Latch release 210 can be manually rotated to the first position against the bias of trigger spring 260 so that first detent portion 215A engages with catch 224 in a cocked position. In the cocked position, catch 224 is firmly seated in first detent portion 215A such that the entire convex face of the catch frictionally engages the first detent portion, creating resistance to rotation in a stable condition.

External force applied to pawl 220 can rotate catch 224 out of engagement with first detent portion 215A, assuming that the external force is sufficient to overcome the resistance to rotation created between the first detent portion and the catch. As catch 224 rotates out of first detent portion 215A, the resistance force opposing trigger spring 260 is gradually decreased until the trigger spring's bias force overcomes the remaining resistance. At this threshold point, latch release 210 snaps to the second position under energy released by one of torsion springs 230A, 230B.

Figure 6:
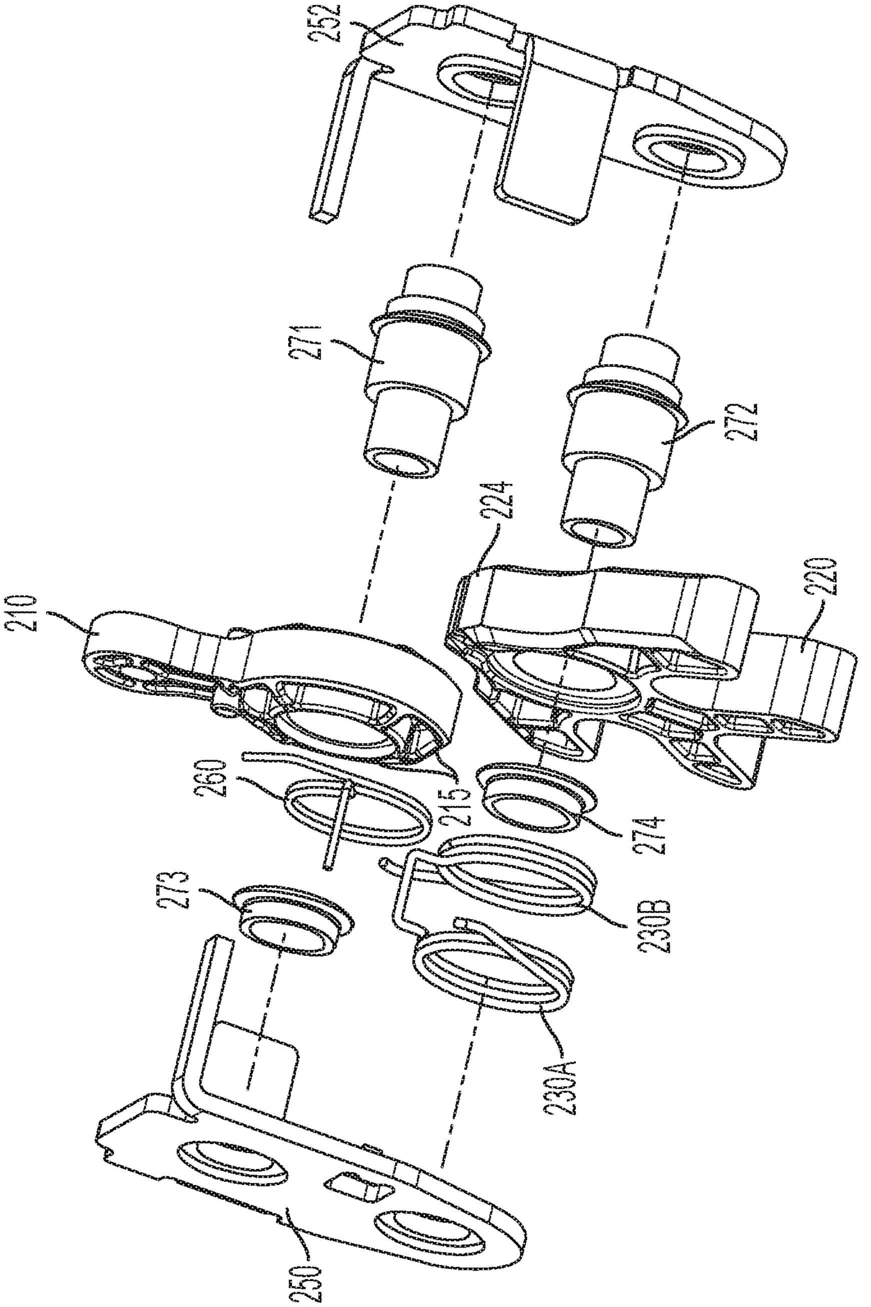
FIG. 6 is an exploded perspective view of the latch assembly of FIG. 5.

Pawl 220 includes first and second contact surfaces 241, 242 configured to receive force from an object such as a striker, similar to first and second contact surfaces 141, 142 in latch assembly 100. Latch assembly 200 also includes first and second rivets 271, 272 and lock rings 273, 274, as shown in FIG. 6, that interconnect the components together.

Figure 10:
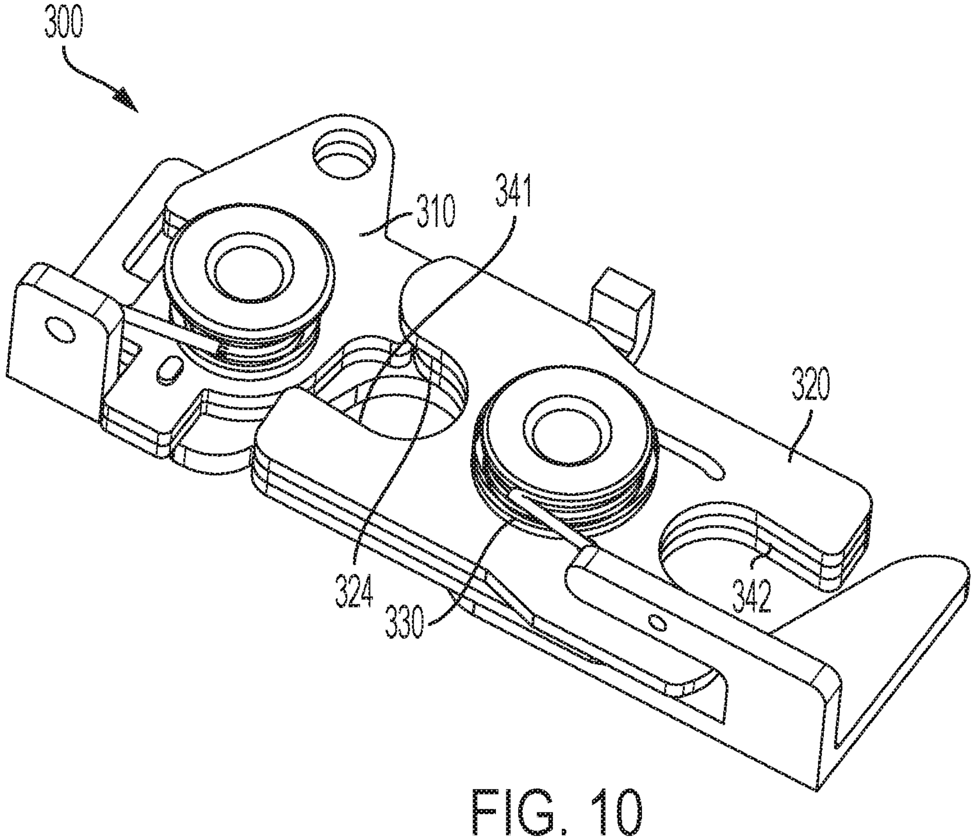
FIG. 10 is a perspective view of a latch assembly according to a third embodiment, with the latch assembly shown in a first operative state.
Figure 11:
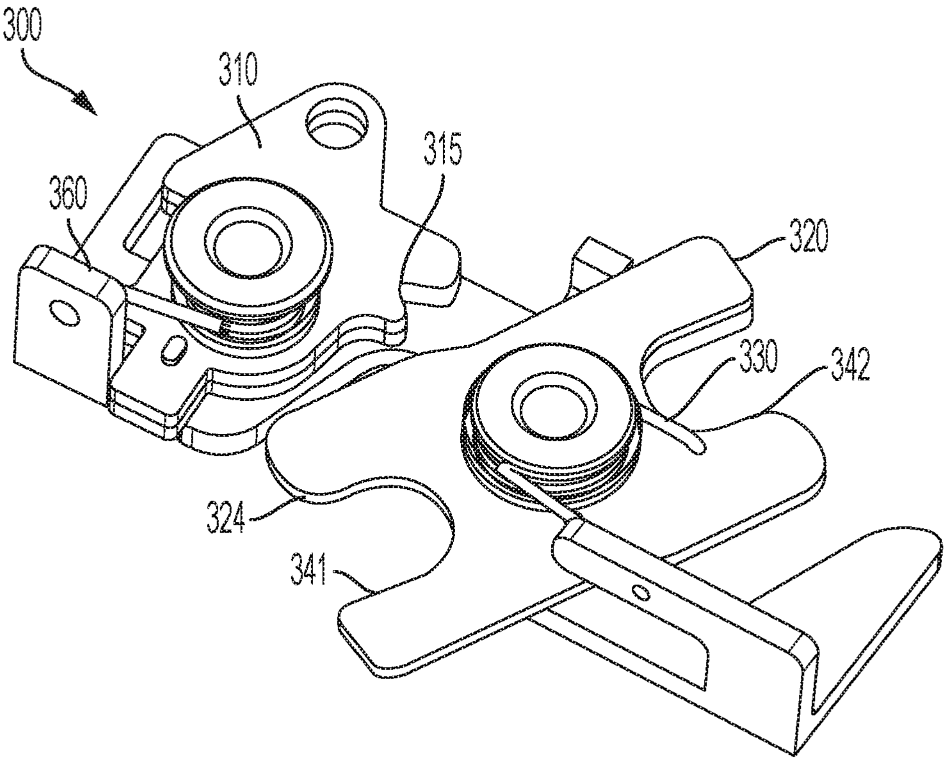
FIG. 11 is another perspective view of the latch assembly of FIG. 10, with the latch assembly shown in a second operative state.

FIGS. 10 and 11 show a latch assembly 300 according to another example. Latch assembly 300 in similar in some respects to latch assemblies 100 and 200, but utilizes a pawl 320 with a single catch 324 that engages a detent 315 on a latch release 310. Pawl 320 is rotatable relative to latch release 310 between a single latched position (FIG. 10) and single released position (FIG. 11). A single torsion spring 330 is attached between pawl 320 and a mounting element, the latter of which is not shown but can be the same or similar to base plates 150, 250, or equivalent mounting elements. Torsion spring 330 winds and stores energy as pawl 320 is rotated by external force toward the latched position, and unwinds to release the energy when detent 315 is disengaged from catch 324. A trigger spring 360 analogous to trigger spring 260 stores and releases energy in response to the relative orientation of latch release 310, biasing the latch release toward the orientation shown in FIG. 10 to engage catch 324.

Pawl 320 has first and second contact surfaces 341, 342 that are arranged on opposite ends of the pawl. First contact surface 341 is configured to receive force from an object such as a striker from a first side of latch assembly 300. Second contact surface 342 is configured to receive force from an object from a second side of latch assembly 300. Thus, latch assembly 300 can work with strikers arranged on both sides of the latch assembly, similar to latch assemblies 100, 200.

Figure 12:
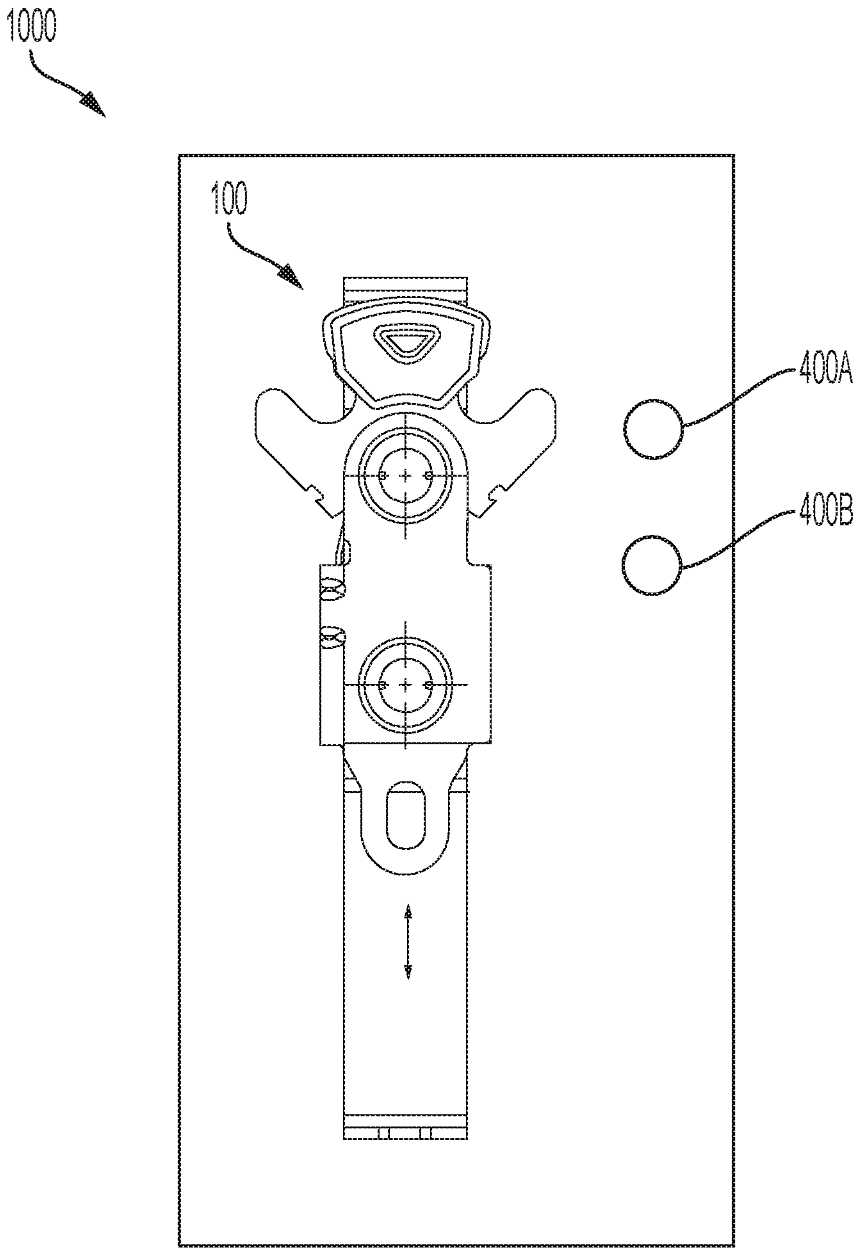
FIG. 12 is a schematic view of a latch assembly kit according to the present disclosure.

Latch assemblies according to the present disclosure can be distributed as stand alone products. Alternatively, latch assemblies according to the present disclosure can be distributed in kits with other components. For example, a kit according to the present disclosure can include a latch assembly and one or more strikers. FIG. 12 schematically shows a kit 1000 that includes latch assembly 100, a first striker 400A and a second striker 400B.

Latches according to the present disclosure can be used with objects mounted on a pivot axis. The objects can pivot through an angular range between 0-360 degrees. For example, the range can be 45 degrees, 90 degrees, 135 degrees, 180 degrees, or other range that is selected for a given application. In these arrangements, the objects can pivot between a first position and a second position, with a first striker located at the first position and a second striker located at the second position. When the object is pivoted to the first position, the latch can engage the first striker to secure the object in the first position. Similarly, when the object is pivoted to the second position, the latch can engage the second striker to secure the object in the second position.

Latches can also pivot through a 360 degree range and utilize a single striker. In such an application, the first side of the latch can connect to a first side of the striker. After the object is pivoted about the pivot axis 360 degrees, a second side of the latch opposite the first side of the latch can reconnect with the striker.

Figure 13:
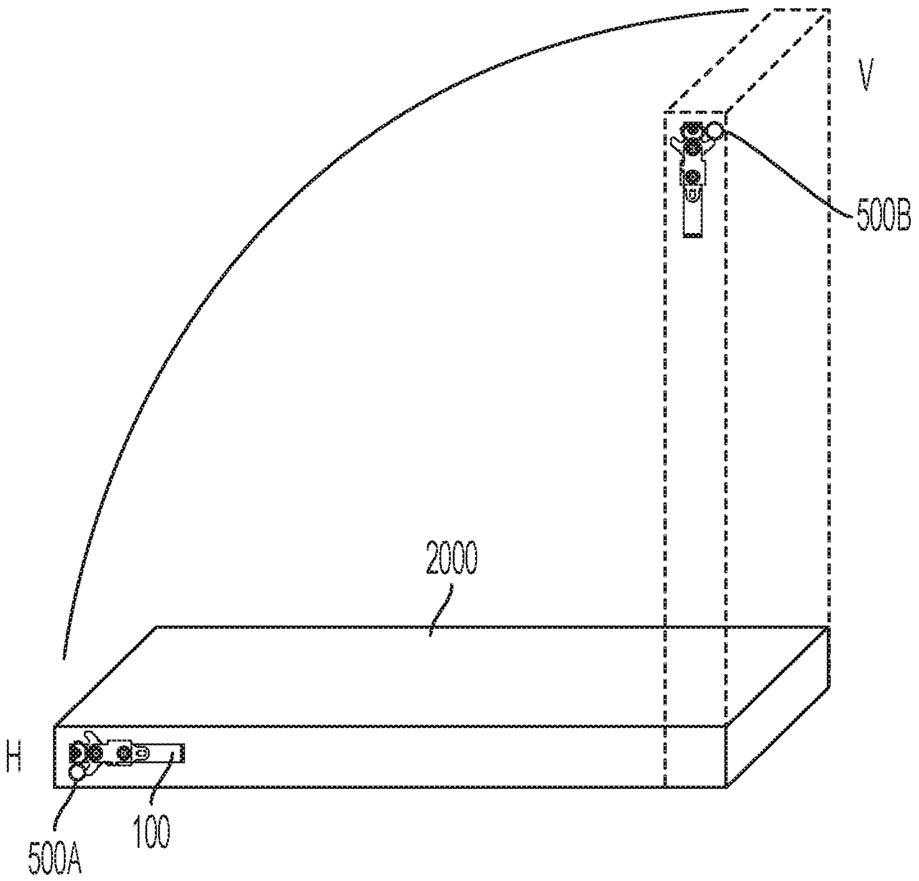
FIG. 13 is a schematic view of an object with a latch assembly kit according to the present disclosure mounted in a pivoting arrangement.

Latch assemblies according to the present disclosure can be distributed with fixtures, furnishings or other products that require the latch assemblies. FIG. 13 schematically shows a foldable bunk bed 2000 with a latch assembly 100, a first striker 500A and a second striker 500B. When installed, bunk bed 2000 is pivotable between a first or horizontal position H and a second or vertical position V. Horizontal position H and vertical position V are separated by an angle of 90 degrees. Bunk bed 2000 is lockable in the horizontal position H by engagement of rotary latch assembly 100 with first striker 500A, and lockable in the vertical position V by engagement of the rotary latch assembly with second striker 500B. Latch assembly 100 can also engage one or more additional strikers to lock bunk bed 2000 in one or more intermediate positions between horizontal position H and vertical position V.

Figure 14:
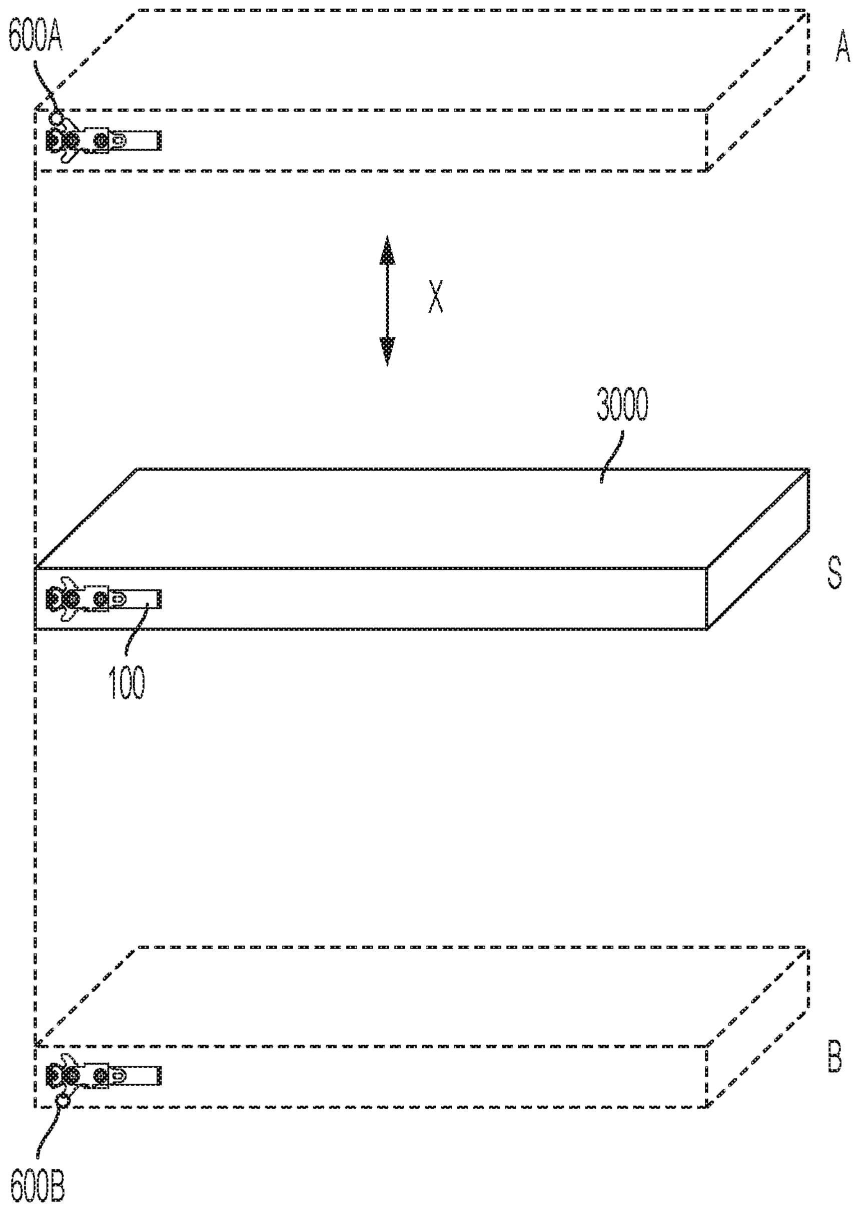
FIG. 14 is a schematic view of an object with a latch assembly kit according to the present disclosure mounted in a first translating arrangement.

Latch assemblies according to the present disclosure can also be used in non-pivoting applications, such as applications that only allow translation in one or more directions. FIG. 14 schematically shows an object 3000 that can translate or slide along one axis of movement X from a starting position S to a first position at position A. Object 3000 can also translate or slide from the starting position S along axis X to a second position at position B. Latch assembly 100 engages a first striker 600A when object 3000 reaches position A, and engages a second striker 600B when object 3000 reaches position B. As with the previous example, latch assembly 100 can also engage one or more additional strikers to lock object 3000 in one or more intermediate positions between position A and position B.

Figure 15:
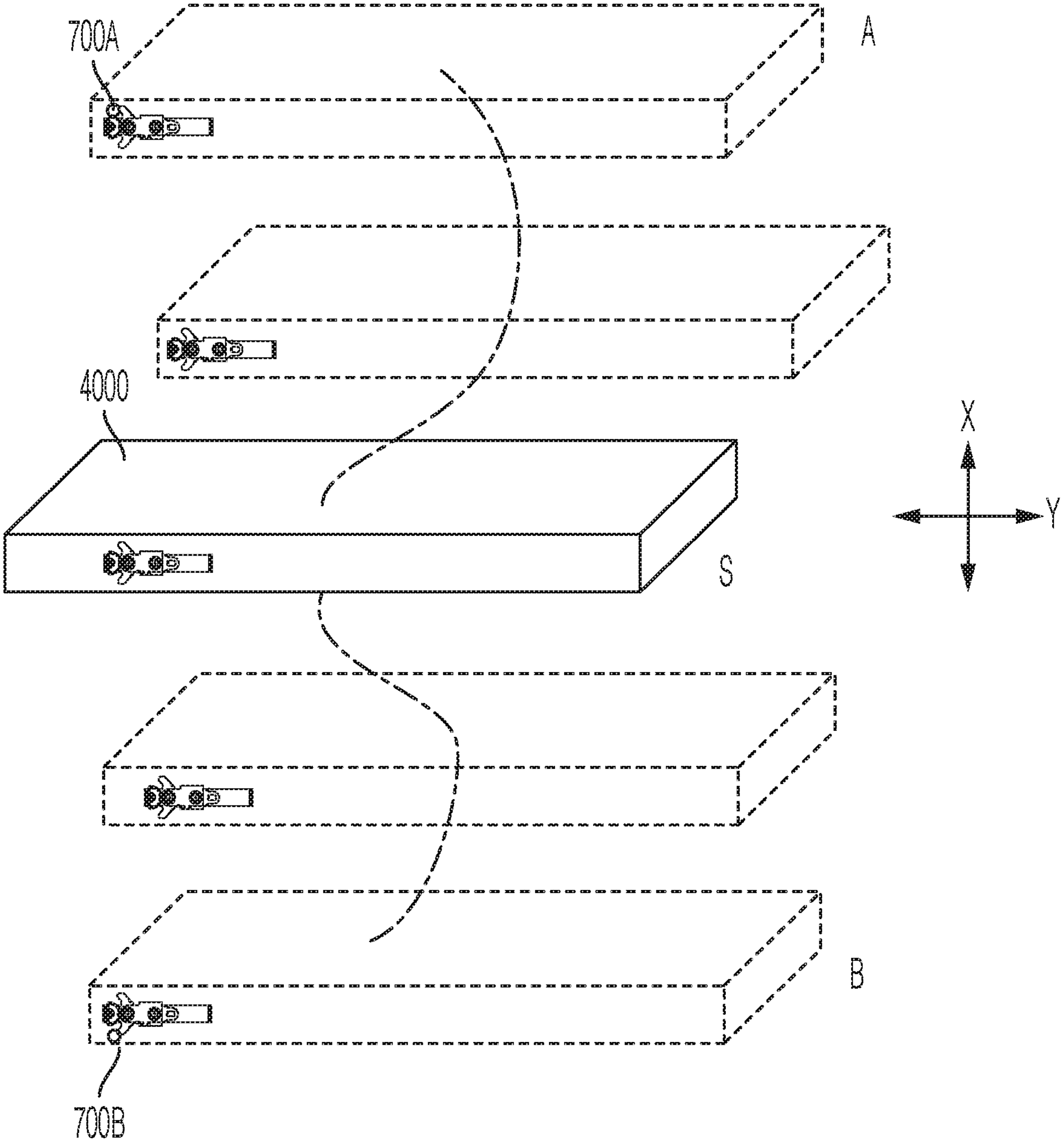
FIG. 15 is a schematic view of an object with a latch assembly kit according to the present disclosure mounted in a second translating arrangement.

FIG. 15 schematically shows another object 4000 that can translate or slide in two axes of movement. In particular, object 4000 can translate along a first axis of movement X, and translate along a second axis of movement Y. Object 4000 can move from a starting position S to a first position at position A, and move from the starting position to a second position at position B. Latch assembly 100 engages a first striker 700A when object 4000 reaches position A, and engages a second striker 700B when object 4000 reaches position B. Position A and position B are axially aligned, but object 4000 can move through an infinite number of positions between positions A and B that are not in alignment with positions A and B. Thus, object 4000 can move through an infinite number of paths between position A and position B, with the wave shaped dashed lines showing just one possible path of movement between position A and position B. As with the previous example, latch assembly 100 can also engage one or more additional strikers to lock object 4000 in one or more intermediate positions between position A and position B.

While preferred embodiments have been shown and described herein, it will be understood that such embodiments are provided by way of example only. Numerous variations, changes and substitutions will occur to those skilled in the art without departing from the spirit of the present disclosure. For example, the pivot coupling 151 and slide coupling 155 of latch assembly 100 can utilize rivets like the rivets 271, 272 in latch assembly 200. Accordingly, it is intended that the appended claims cover all such variations as fall within the spirit and scope of the invention.

What is claimed:

1. A rotary latch assembly comprising:

a latch release having a detent;

a pawl that is rotatable relative to the latch release about a pivot axis, the pawl comprising three catches, wherein each catch is configured for individually engaging the detent to releasably hold the pawl in a fixed orientation;

at least two contact surfaces offset from the pivot axis; and at least one spring mounted to the pawl;

the pawl being rotatable relative to the latch release between a neutral orientation and at least two non-neutral orientations;

the at least one spring accumulating a stored energy during rotation of the pawl toward the at least two non-neutral orientations in response to force applied to one of the at least two contact surfaces;

the spring releasing the stored energy when force is removed from said one of the at least two contact surfaces to rotate the pawl toward the neutral orientation;

wherein the pawl defines an axis of symmetry extending between a third catch of the three catches and a pivot center aligned with the pivot axis, such that the at least two contact surfaces are arranged symmetrically about the axis of symmetry and second and first catches of the three catches are also arranged symmetrically about the axis of symmetry; and wherein the at least one spring mounted to the pawl comprises a first torsion spring and a second torsion spring.

2. The rotary latch assembly of claim 1, wherein the at least two contact surfaces comprise a first contact surface and a second contact surface.

3. The rotary latch assembly according to claim 2, wherein the pawl is rotatable relative to the latch release in a first direction in response to force applied to the first contact surface, and rotatable relative to the latch release in a second direction in response to force applied to the second contact surface.

4. The rotary latch assembly according to claim 1, wherein the at least two non-neutral orientations of the pawl comprises a first orientation, in which the first catch of the pawl engages the detent of the latch release.

5. The rotary latch assembly according to claim 4, wherein the at least two non-neutral orientations of the pawl comprises a second orientation, in which the second catch of the pawl engages the detent of the latch release.

6. The rotary latch assembly according to claim 5, wherein the first orientation is different from the second orientation.

7. The rotary latch assembly according to claim 1, wherein the first torsion spring stores energy in response to rotation of the pawl in the first direction, and wherein the second torsion spring stores energy in response to rotation of the pawl in the second direction.

8. The rotary latch assembly according to claim 1, wherein the third catch is between the first catch and the second catch.

9. The rotary latch assembly according to claim 8, wherein the third catch of the pawl engages the detent of the latch release in the neutral orientation.

10. A kit comprising:

the rotary latch assembly according to claim 1; and at least one striker.

11. A fixture comprising:

the rotary latch assembly according to claim 1;

a first striker;

a second striker; and an object that is movable between a first position and a second position, the object being lockable in the first position by engagement of the rotary latch assembly with the first striker, and lockable in the second position by engagement of the rotary latch assembly with the second striker.

12. The fixture of claim 11, wherein the object is a bunk bed.

13. The fixture of claim 11, wherein the object is pivotable between the first position and the second position.

14. The fixture of claim 11, wherein the object is translatable between the first position and the second position.

15. The rotary latch assembly according to claim 1, wherein the axis of symmetry extends between the third catch, a midpoint of the third catch, and the pivot center.

16. The rotary latch assembly according to claim 1, wherein the pawl is rotatable relative to the latch release toward the at least two non-neutral orientations in response to force applied to either of the at least two contact surfaces.

17. A rotary latch assembly comprising:

a latch release having a detent;

a pawl that is rotatable relative to the latch release about a pivot axis, the pawl comprising three catches, wherein each catch is configured for individually engaging the detent to releasably hold the pawl in a fixed orientation;

at least two contact surfaces offset from the pivot axis; and at least one spring mounted to the pawl;

the pawl being rotatable relative to the latch release between a neutral orientation and at least two non-neutral orientations;

the at least one spring accumulating a stored energy during rotation of the pawl toward the at least two non-neutral orientations in response to force applied to one of the at least two contact surfaces;

the spring releasing the stored energy when force is removed from said one of the at least two contact surfaces to rotate the pawl toward the neutral orientation;

wherein the pawl defines an axis of symmetry extending between a third catch of the three catches and a pivot center aligned with the pivot axis, such that the at least two contact surfaces are arranged symmetrically about the axis of symmetry and second and third catches of the three catches are also arranged symmetrically about the axis of symmetry; and a mounting element, wherein the pawl is pivotally mounted to the mounting element, wherein the latch release is rotatable but not axially translatable relative to the mounting element.

18. The rotary latch assembly according to claim 17, wherein the latch release is movable relative to the mounting element between a latching position, in which the detent mates with one of the three catches to releasably hold the pawl in a fixed orientation, and a release position, in which the detent is not engaged with the three catches.

19. The rotary latch assembly according to claim 17, further comprising a trigger spring mounted between the latch release and mounting element, the trigger spring biasing the latch release toward the latching position.

20. The rotary latch assembly according to claim 17, wherein the latch release is movable in only one direction relative to the mounting element when moved toward the release position.

21. The rotary latch assembly according to claim 20, wherein the latch release is movable in only one direction relative to the mounting element when the pawl is in the neutral orientation or in any of the at least two non-neutral orientations.

22. The rotary latch assembly according to claim 17, wherein the mounting element comprises a housing having a rear base plate and a cover plate.

23. The rotary latch assembly according to claim 17, wherein the latch release is axially translatable but not rotatable relative to the mounting element.

24. A rotary latch assembly comprising:

a latch release having a detent;

a pawl that is rotatable relative to the latch release about a pivot axis, the pawl comprising three catches, wherein each catch is configured for individually engaging the detent to releasably hold the pawl in a fixed orientation;

at least two contact surfaces offset from the pivot axis; and at least one spring mounted to the pawl;

the pawl being rotatable relative to the latch release between a neutral orientation and at least two non-neutral orientations;

the at least one spring accumulating a stored energy during rotation of the pawl toward the at least two non-neutral orientations in response to force applied to one of the at least two contact surfaces;

the spring releasing the stored energy when force is removed from said one of the at least two contact surfaces to rotate the pawl toward the neutral orientation;

wherein the pawl defines an axis of symmetry extending between a third catch of the three catches and a pivot center aligned with the pivot axis, such that the at least two contact surfaces are arranged symmetrically about the axis of symmetry and second and first catches of the three catches are also arranged symmetrically about the axis of symmetry; and wherein the pawl is rotatable relative to the latch release in a first direction to reach one of the at least two non-neutral positions and in response to force applied to the first contact surface, and the pawl is rotatable relative to the latch release in a second direction to reach the neutral position in response to release of the detent from engagement with the pawl.

25. The rotary latch assembly according to claim 24, wherein the first direction is different from the second direction.

* * * * *